United States Patent [19]
Kurita et al.

[11] Patent Number: 5,831,943
[45] Date of Patent: Nov. 3, 1998

[54] STABILIZED OVERWRITEABLE OPTICAL RECORDING METHOD USING LASER BEAM INTENSITY SETTINGS

[75] Inventors: Shinichi Kurita, Yokohama; Hiroyuki Matsumoto, Tokyo; Koichiro Ishii, Zushi; Masashi Horikawa, Tokyo, all of Japan

[73] Assignee: Nikon Corporation, Tokyo, Japan

[21] Appl. No.: 744,859

[22] Filed: Nov. 5, 1996

[30] Foreign Application Priority Data

Nov. 7, 1995 [JP] Japan ................................ 7-288306
Nov. 7, 1995 [JP] Japan ................................ 7-288307

[51] Int. Cl.$^6$ ................................................ G11B 11/00
[52] U.S. Cl. ........................... 369/13; 369/54; 369/116
[58] Field of Search ........................... 369/13, 116, 54, 369/53, 58, 14; 360/59, 114

[56] References Cited

U.S. PATENT DOCUMENTS

| | | | |
|---|---|---|---|
| 5,226,027 | 7/1993 | Bakx | 369/116 |
| 5,239,524 | 8/1993 | Sato et al. | 369/13 |
| 5,303,217 | 4/1994 | Bakx et al. | 369/54 |
| 5,305,297 | 4/1994 | Nishiuchi et al. | 369/116 |
| 5,359,589 | 10/1994 | Mashimo | 369/116 |
| 5,475,666 | 12/1995 | Ito et al. | 369/54 |
| 5,617,399 | 4/1997 | Spruit et al. | 369/116 |
| 5,623,472 | 4/1997 | Bakx et al. | 369/116 |

FOREIGN PATENT DOCUMENTS

| | | |
|---|---|---|
| 0 430 649 A2 | 6/1991 | European Pat. Off. . |
| 0 446 892 A2 | 9/1991 | European Pat. Off. . |

*Primary Examiner*—Tan Dinh

[57] ABSTRACT

A stabilized overwriteable optical recording method, wherein overwriting is performed sufficiently because erasure does not become poor with the low level laser beam intensity $P_L$ being set too low. In a method of setting the recording laser beam intensity by performing test recording on an overwriteable optical recording medium, the setting of the low level recording laser beam intensity and the setting of the high level recording laser beam intensity are respectively independently performed. According to a different embodiment of the invention, another stabilized overwriteable optical recording method is disclosed. After the signal of a predetermined pattern has been recorded on an overwriteable optical recording medium, the recorded predetermined pattern is played back, and by a comparison of the pattern recovered from its playback signal with the predetermined pattern, an appropriate recording laser beam intensity is found.

10 Claims, 4 Drawing Sheets

STABILIZED OVERWRITEABLE OPTICAL RECORDING METHOD USING LASER BEAM INTENSITY SETTINGS

CROSS REFERENCE TO RELATED APPLICATIONS

This application is based upon and claims priority from Japanese Patent Applications Nos. 07-288306and 07-288307, both filed Nov. 7, 1995, the contents of each being incorporated herein by reference.

BACKGROUND OF THE INVENTION

1. Field of the Invention

The present invention relates to optical recording methods. More particularly, the present invention relates to a stabilized overwriteable optical recording method wherein overwriting is performed sufficiently because erasure does not become poor due to a low level laser beam intensity $P_L$ being set too low.

2. Description of the Related Art

In recent years, there has been a proliferation of optical recording and replay methods, and of the optical recording devices, replay devices and recording media used therein, satisfying the requirements for high density, large capacity, and high access speeds, together with high recording and replay speeds.

Many kinds of principles—opening holes by heat, phase change, magnetooptical and the like—have been used in optical recording and replay methods. Among these, the phase change or magnetooptical methods which allow for erasure of data after data has been recorded, with recording being again possible of new data, are being widely used for external memories of computers and for consumer-use audio equipment.

Until lately, in methods of optical recording and playback, once data had been recorded, it was not possible to overwrite the data record with new data without performing an erasing process. However, just by modulating the intensity of an illuminating light beam in compliance with the digital data to be recorded, an optical recording method in which overwriting is possible, an overwriteable recording medium used therein, and a recording device with which overwriting is performed by the use of this method, have been proposed.

This is described as an example of magnetooptical recording. Moreover, patents have been applied for in several countries for this method, and among them, an issued U.S. Pat. No. 5,239,524 and related Japanese Laid-Open Patent Publication 62-175948 and German Patent Application 3,619,618-A1. This invention is cited hereinbelow as the "basic invention".

The storage layer of this overwriteable magnetooptical recording medium which is used in this magnetooptical recording and playback method include multiple layers of magnetic layers having perpendicular magnetic anisotropy (perpendicular magnetic layer or layers). These magnetic layers comprise, for example, TbFe, TbFeCo, GdFe, GdFeCo, DyFe, DyFeCo and the like.

The medium used in the basic invention is "An overwriteable multi-layer magnetooptical recording medium, in which basically layers functioning as recording and playback layers (termed below "memory layers" or "M-layers"), consisting of perpendicularly magnetizable magnetic thin film(s), and recording auxiliary layer(s) (termed hereinbelow "recording layers" or "W-layers") comprising the same perpendicularly magnetizable magnetic thin films, both layers being exchange-coupled, and also, at room temperature, only the magnetization of W-layers can be oriented in a predetermined direction without changing the direction of magnetization of the M-layer." The W-layers, in comparison with the M-layers, have a low coercivity force Hc at room temperature and a high Curie point Tc.

The data is then recorded in the M-layer (or as the case may be, also in the W-layer) as marks having a direction of magnetization perpendicular to the substrate ("A direction") and as marks having magnetization in a direction opposite to this ("anti-A direction").

In this medium, the W-layer can arrange its direction of magnetization in one direction by means of a magnetic field (for example, an initial auxiliary magnetic field, $H_{ini}$) without changing the direction of the magnetization of the M-layer. Furthermore, once the direction of magnetization of the W-layer has been arranged in one direction, it does not reverse even though it receives exchange coupling force from the M-layer, and on the contrary, the direction of magnetization of the M-layer does not reverse even though it receives exchange coupling force from the W-layer, which was arranged in one direction.

In the recording method of the basic invention, only the direction of magnetization of the W-layer of the recording medium is arranged in one direction, by a magnetic field just before recording. In addition to this, a laser beam, pulse modulated according to digitized data, illuminates the medium. The intensity of the laser beam is controlled to two values, a high level $P_H$ and a low level $P_L$, corresponding to a high level and a low level of the pulses. This low level is higher than the replay level $P_R$ which illuminates the medium during replay. As is already known, even when not recording, for example in order to access a predetermined recording place in the medium, the laser is generally controlled at a "very low level". This very low level, also, is the same as, or close to, the replay level $P_R$.

In the case that a low level laser beam illuminates the medium, at the temperature which the medium reaches, the direction of magnetization of the W-layer does not change. The direction of magnetization of the M-layer becomes the direction of a state in which no magnetic walls exist between the M-layer and the W-layer. This is called a low temperature process. The temperature region according to this process is called the low temperature process temperature $T_L$.

On the other hand, in the case that a high level laser beam illuminates the medium, at the higher temperature which the medium reaches, the direction of magnetization of the W-layer follows the direction of the recording magnetic field. The direction of magnetization of the M-layer becomes the direction of a state in which no magnetic walls exist between the M-layer and the W-layer. This is called a high temperature process. The temperature region according to this process is called the high temperature process temperature $T_H$.

After illumination with the laser beam, by applying the magnetic field, the magnetization of the W-layer which followed the direction of the recording magnetic field due to the high level laser beam illumination, again follows the direction of the magnetic field. Accordingly, if the direction of magnetization of the magnetic field and the direction of the recording magnetic field are reversed, in the M-layer, already recorded, a recording reiterating a new recording (namely, overwriting) is possible. This is the principle of optically modulated overwrite magnetooptical recording.

The method described above forms a record mark by illumination with a high level laser beam, and erases the record mark by illumination with a low level laser beam, and can be said to overwrite a new record over an old record.

However, in the case of performing actual recording on an optical disk, in order to optimize the shape of the record marks, it is necessary to finely adjust the laser beam intensity in relation to the recording sensitivity of the disk to be recorded, the optimum recording temperature, and the environmental temperature. In the magnetooptical disk recording devices presently marketed, a fine adjustment of the laser beam intensity is performed by performing a test recording before the actual recording of data.

Nevertheless, even when performing a fine adjustment of the laser beam intensity by performing a test recording, there were cases which were judged to be erroneous recording in overwrite optical recording. In such cases, the cause of this was generally that the record marks from the previous time were not sufficiently erased by the low level $P_L$ laser beam intensity.

In optical intensity modulated overwrite recording, this is because the low level laser beam intensity $P_L$ is an important parameter involved in not only recording, but also erasure. Even if the recording laser beam intensity was found by performing a test recording, overwriting was insufficiently performed, because erasure became poor when $P_L$ was set too low.

SUMMARY OF THE INVENTION

Accordingly, it is an object of the present invention to provide an optical recording method by which stabilized overwrite recording may be performed, solving the above problems.

Objects of the present invention are achieved by a method of optical recording according to a first embodiment comprising the steps of setting a recording laser beam intensity by performing a test recording on an overwriteable optical recording medium, wherein setting of a low level recording laser beam intensity and setting of a high level recording laser beam intensity are independently performed.

Further objects of the invention are achieved by a method according to a second embodiment comprising the steps of recording a signal of a predetermined pattern on an overwriteable optical recording medium, playing back the recorded predetermined pattern, and comparing a pattern recovered from a playback signal with the predetermined pattern, thus finding an appropriate recording laser beam intensity.

Yet further objects of the present invention are achieved by a method of optical recording comprising the steps of recording a signal of a predetermined pattern on an overwriteable optical recording medium without erasing a region on which recording was performed, again recording the predetermined pattern in the region, playing back the recorded predetermined pattern, and comparing a pattern recovered from a playback signal with the predetermined pattern, thus finding an appropriate recording laser beam intensity.

Additional objects and advantages of the invention will be set forth in part in the description which follows and, in part, will be obvious from the description, or may be learned by practice of the invention.

BRIEF DESCRIPTION OF THE DRAWINGS

These and other objects, features, and characteristics of the present invention will become apparent to those skilled in the art from a study of the following detailed description, the appended claims and drawings, all of which form a part of this specification. In the drawings:

DETAILED DESCRIPTION OF THE PREFERRED EMBODIMENTS

Reference will now made in detail to the presently preferred embodiments of the present invention, examples of which are illustrated in the accompanying drawings.

Embodiment 1

The first embodiment is one relating to the case in which the recording laser beam intensity is modulated to two values, a low level $P_L$ and a high level $P_H$, according to the data to be recorded.

First, a magnetooptical disk is provided which can be overwritten by optical modulation. This magnetooptical disk is divided into a plurality of recording zones whose recording frequencies differ. In a predetermined region, recording laser beam intensity standard value data for each recording zone is recorded.

Setting this magnetooptical disk in a record and replay device, standard values of low level and high level recording laser beam intensity are read in from the predetermined region in each recording zone.

Figure 1A:
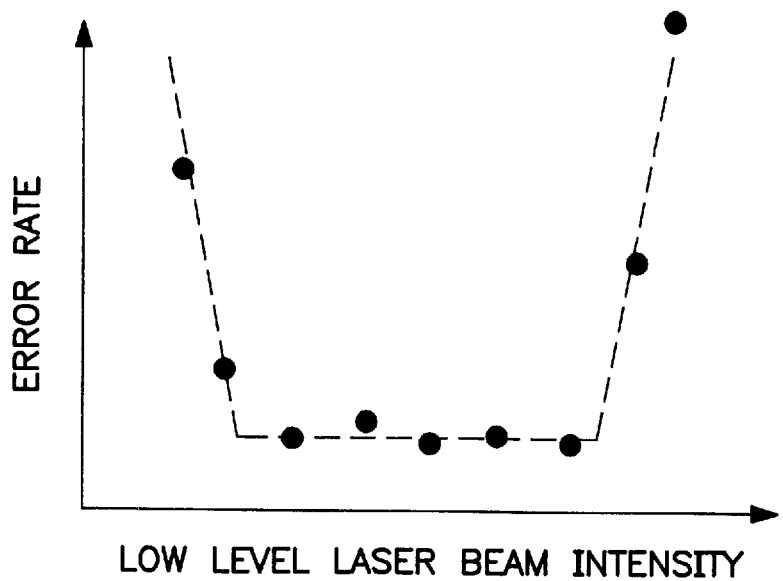
FIGS. 1a and 1b are illustrative diagrams showing the steps of setting the low level and the high level of the laser beam intensity for the optical recording method according to a first embodiment of the present invention.

Next, recording is performed according to a test pattern in order to set the low level $P_L$ of the recording laser beam intensity, fixing the high level at a standard value and causing only the low level to change. This test pattern contains long spaces. Next, playing back the recorded pattern and measuring the error rate, the low level $P_L$ is set close to the center of the range in which the error rate is lower than a predetermined value. This is shown in FIG. 1a.

Figure 1B:
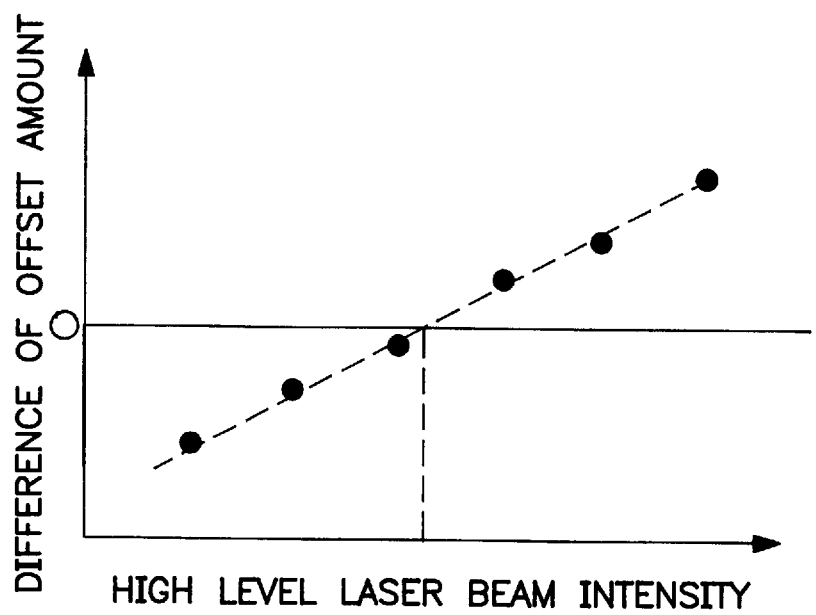

Next, recording is performed according to a test pattern in order to set the high level of the recording laser beam intensity, fixing the low level $P_L$ which has already been set, and causing only the high level to change. This test pattern contains repetitions of short marks and repetitions of long marks, performed alternately. Next, the recorded pattern is played back, and the high level $P_H$ is set where the difference becomes zero of the offset amount of the pattern of repeated short marks and the offset amount of the pattern of repeated long marks. This is shown in FIG. 1b.

The low level and the high level of the recording laser beam intensity are independently set in the above-described manner.

Embodiment 2

Figure 2:
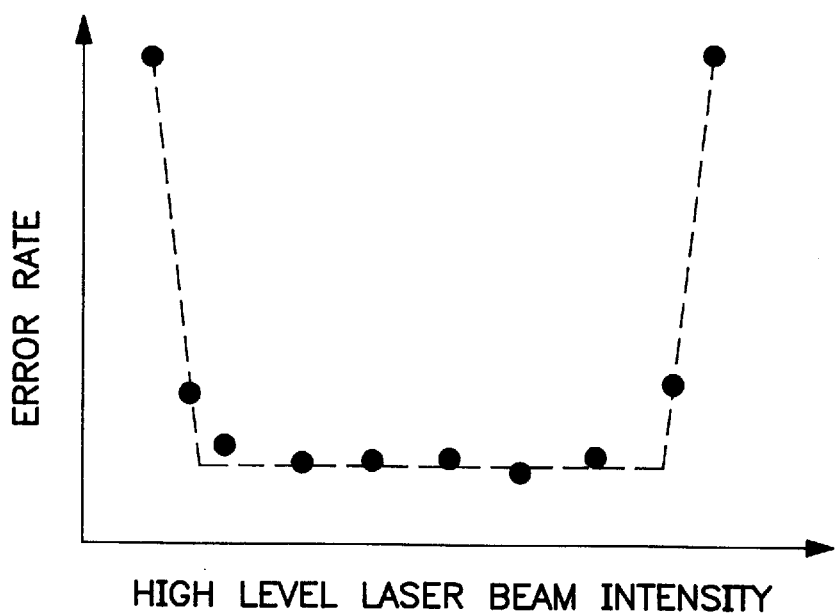
FIG. 2 is an illustrative diagram showing the steps of setting the high level of the laser beam intensity for the optical recording method according to a second embodiment of the present invention.

A second embodiment of the optical recording method of the present invention is next described with reference to FIG. 2.

This method is performed in the same manner as the first embodiment up to the setting of the low level $P_L$ of the recording laser beam intensities.

Next, a random pattern, in order to set the high level of the recording laser beam intensity, is set by a combination of the value $P_L$ which was previously set and the high level, and at this time, while causing the high level to change, a test pattern is recorded. Next, playing back the recorded pattern and measuring the error rate, the high level $P_H$ is set close to the center of the range in which the error rate is lower than a predetermined value. This is shown in FIG. 2.

The low level and the high level of the recording laser beam intensity are set in the above-described manner.

Embodiment 3

Figure 3:
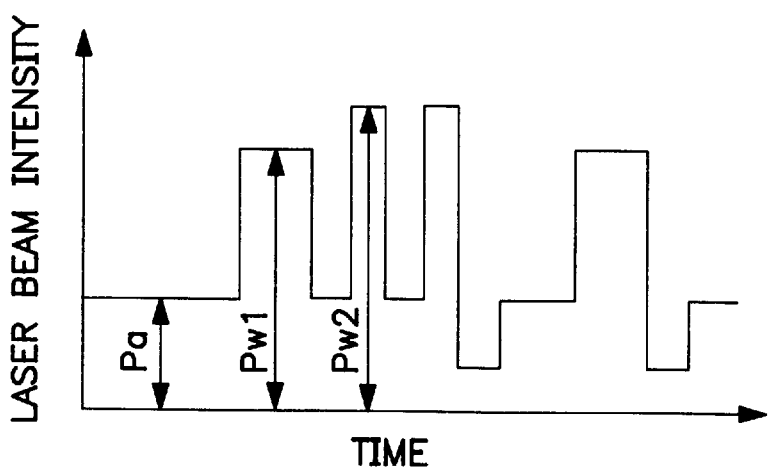
FIG. 3 is an illustrative diagram showing a pattern which modulates the recording laser beam intensity to three values: a low level, a first high level, and a second high level, for the optical recording method according to a third embodiment of the present invention.

A third embodiment of the optical recording method of the present invention is now described. Moreover, the third embodiment, as shown in FIG. 3, is a case in which the recording laser beam intensity is modulated to three values: a low level Pa, a first high level $Pw_1$, and a second high level $Pw_2$.

First, a magnetooptical disk is provided which can be overwritten by optical modulation. This magnetooptical disk is divided into a plurality of recording zones whose recording frequencies differ. In a predetermined region, recording laser beam intensity standard values of a low level, a first high level, and a second high level are recorded.

Setting this magnetooptical disk in a record and replay device, the three standard values of recording laser beam intensities are read in from the predetermined region. Next, recording is performed according to a test pattern in order to set the low level Pa of the recording laser beam intensity, fixing the first high level and second high level at standard values and causing only the low level to change. This test pattern contains long spaces. Next, playing back the recorded pattern and measuring the error rate, the low level Pa is set close to the center of the range in which the error rate is lower than a predetermined value. This is shown in FIG. 1a.

Next, recording is performed according to a test pattern in order to set the first high level and second high level of the recording laser beam intensities, fixing the low level Pa which has already been set, and keeping the ratio of the first high level and the second high level constant, causing these values to change at the same time to keep the ratio therebetween constant. The test pattern contains repetitions of short marks and repetitions of long marks, performed alternately. Next, the recorded pattern is played back, and the first high level $Pw_1$, and the second high level $Pw_2$ are set where the difference becomes zero of the offset amount of the pattern of repeated short marks and the offset amount of the pattern of repeated long marks.

The low level, first high level, and second high level recording laser beam intensities are set in the manner as described above.

By using the optical recording method according to the third embodiment of the present invention as described hereinabove, in the case of recording on an overwriteable optical disk, because the recording laser beam intensity can be appropriately set, overwriting is performed sufficiently because erasure does not become poor with being $P_L$ set too low, and stabilized overwriting can be attained.

Embodiment 4

Figure 4:
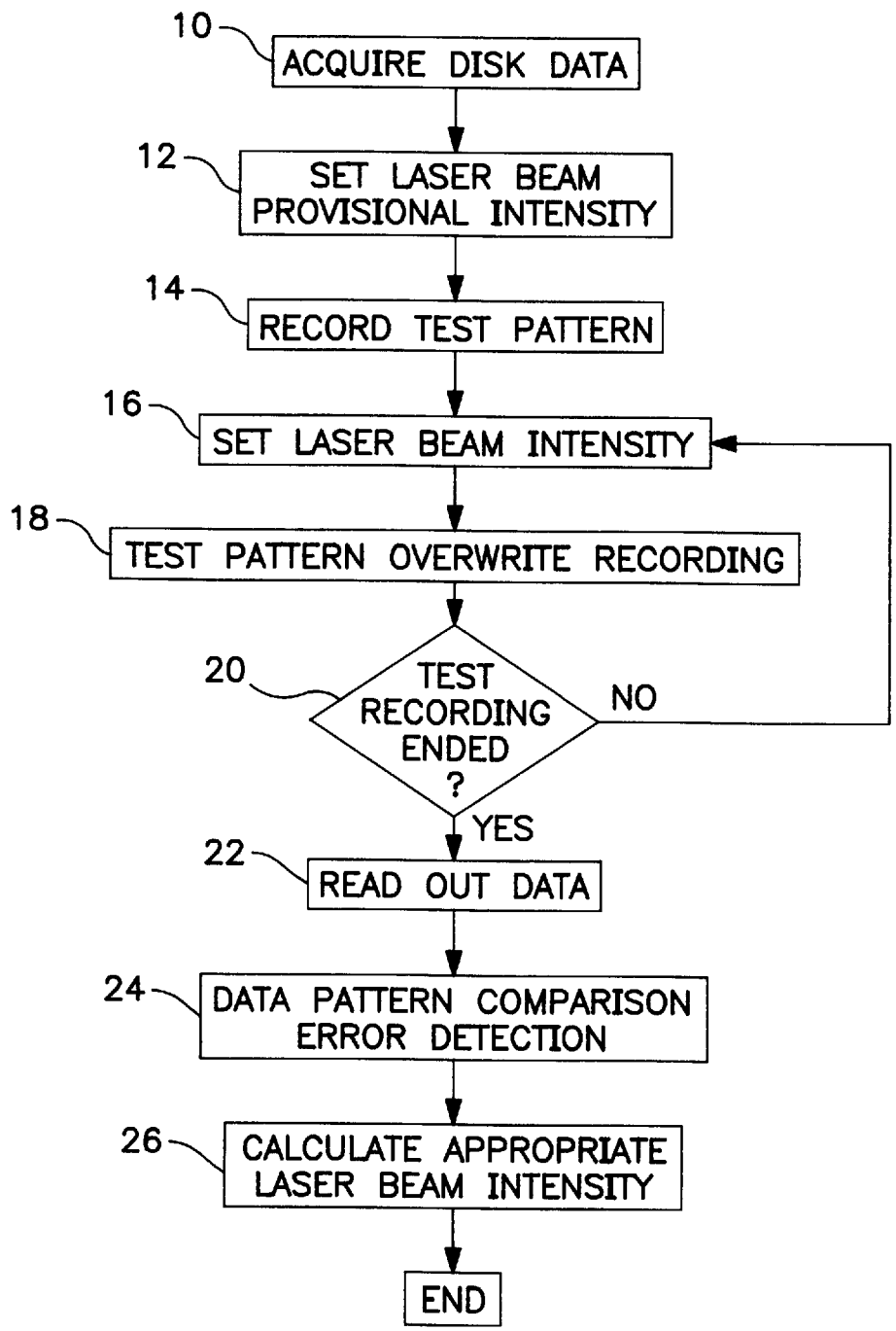
FIG. 4 is a flow chart explaining the operation of a an optical recording method according to a fourth embodiment of the present invention.

A fourth embodiment of the optical recording method of the present invention is described hereinbelow with reference to the drawings. FIG. 4 is a flow chart showing the optical recording method of the fourth embodiment of the present invention.

First, a magnetooptical disk is provided which can be overwritten by optical modulation. This magnetooptical disk is divided into a plurality of recording zones whose recording frequencies differ. In a predetermined region, data is recorded which relates to the recording laser beam intensity at 25° C. in the plurality of zones.

Setting the magnetooptical disk in a record and replay device, data relating to recording laser beam intensity is first read in from the predetermined region in step 10. From these values, low level and high level laser beam intensities and intensity ratios are provisionally set in step 12.

Next, after the test recording regions have once been erased, according to a predetermined pattern for use in test recording, which repeats random marks, test recording is performed in a plurality of sectors in step 14 by the laser beam intensity which was provisionally set. Furthermore, the regions in which recording was performed are not erased, while causing the laser beam intensity to change every sector or every plural sectors in step 16, a specific pattern for test use is overwrite recorded in the same regions in which recording was performed in step 18.

Once test recording has ended in step 20, the test recorded region is played back in step 22, with the pattern demodulated from the playback signal and the pattern used for test recording being compared in step 24. The number of errors is counted. When the deviation from an appropriate laser beam intensity becomes large, recording was not being appropriately performed or portions of marks which were written/recorded before overwriting remained. If the played back pattern differs from the recorded pattern, the number of errors increases, and it is judged that the recording is erroneous.

Figure 5:
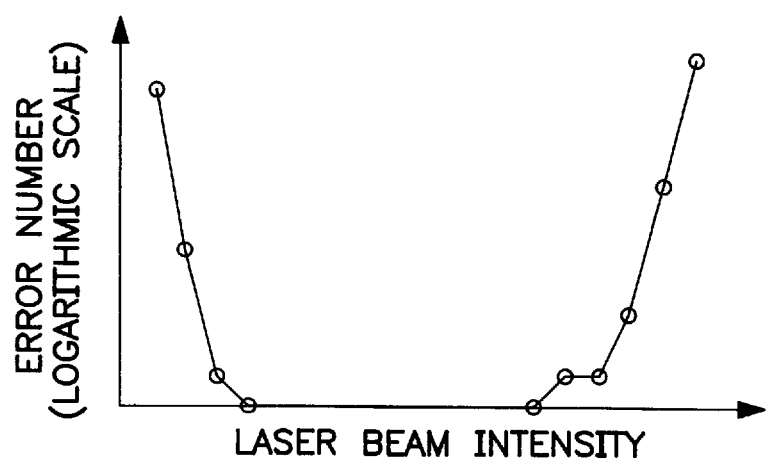
FIG. 5 is a graph showing the relationship between the laser beam intensity and the error number, in an embodiment of the optical recording method of the present invention.

This state of affairs is shown in FIG. 5 An appropriate laser beam intensity exists in a range in which errors are not detected. In practical use, it is appropriate to set the recording laser beam intensity close to the center of the range in which errors are not detected. The appropriate laser beam intensity is set in step 26 of FIG. 4.

In accordance with the embodiment of the optical recording method of the present invention as described hereinabove, in the case of recording on an overwriteable optical disk, because the recording laser beam intensity can be appropriately set, overwriting is performed sufficiently because erasure does not become poor with $P_L$ being set too low, and stabilized overwriting can be attained.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of optical recording, comprising the steps of:
   setting a recording laser beam intensity by performing a test recording on an overwriteable optical recording medium,
   wherein setting of a low level recording laser beam intensity and setting of a high level recording laser beam intensity are independently performed.

2. A method of optical recording according to claim 1, further comprising the step of using a magnetooptical recording medium that contains at least two magnetic layers that are mutually exchange coupled as a recording medium.

3. A method of optical recording according to claim 1, wherein the step of setting the low level and high level laser beam intensities includes maintaining the high level recording laser beam intensity at a predetermined value;

performing a test recording;

causing the low level recording laser beam intensity to change; and setting only the low level of recording laser beam intensity within a range in which appropriate recording is performed.

4. A method of optical recording according to claim 1, wherein the step of setting the laser beam intensities includes the steps of setting the low level recording laser beam intensity to a predetermined value, and maintaining the low level recording laser beam intensity at the predetermined value;

performing a test recording;

causing the high level recording laser beam intensity to change; and setting only the high level of recording laser beam intensity within a range in which appropriate recording is performed.

5. A method of optical recording according to claim 1, wherein the setting step includes choosing the range in which appropriate recording is performed as a range in which an error rate is lower than the predetermined value.

6. A method of optical recording according to claim 4, wherein the setting step includes choosing the range in which appropriate recording is performed as a range in which an error rate is lower than the predetermined value.

7. A method of optical recording, comprising the steps of:

recording a signal of a predetermined pattern on an overwriteable optical recording medium;

playing back the recorded predetermined pattern; and comparing a pattern demodulated from a playback signal with the predetermined pattern to independently find one of an appropriate recording low level and high level laser beam intensity.

8. A method of optical recording, comprising the steps of:

recording a signal of a predetermined pattern on an overwriteable optical recording medium without erasing a region on which recording was performed;

again recording the predetermined pattern in the region;

playing back the recorded predetermined pattern; and comparing a pattern recovered from a playback signal with the predetermined pattern to independently find one of an appropriate recording low level and high level laser beam intensity.

9. A method of optical recording according to claim 7, further comprising the step of using a magnetooptical recording medium which includes at least two magnetic layers which are mutually exchange coupled as the overwriteable recording medium.

10. A method of optical recording according to claim 1, further comprising the step of using a magnetooptical recording medium that contains at least two magnetic layers that are mutually exchange coupled as a recording medium.

* * * * *